June 29, 1965   N. R. ZABEL ETAL   3,192,533
APPARATUS FOR STUDYING EXPLOSIONS STEREOSCOPICALLY
Original Filed Oct. 23, 1959   5 Sheets-Sheet 1

INVENTORS
Norman R. Zabel
David E. Brink, deceased,
by Virginia W. Brink, Executrix,
BY John O. Evans, Jr.
ATTORNEY June 29, 1965    N. R. ZABEL ETAL    3,192,533
APPARATUS FOR STUDYING EXPLOSIONS STEREOSCOPICALLY
Original Filed Oct. 23, 1959    5 Sheets-Sheet 3
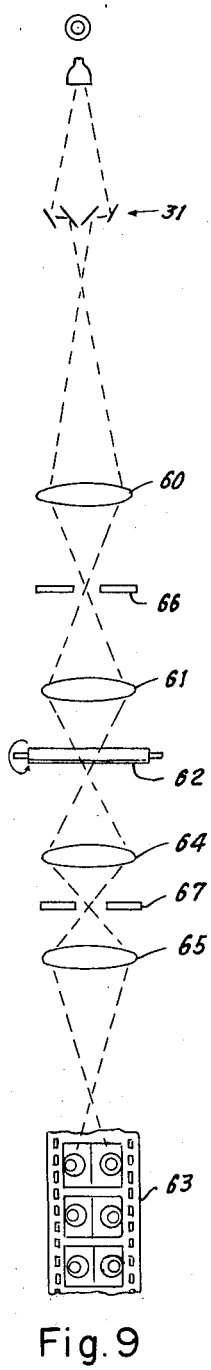
Fig. 9
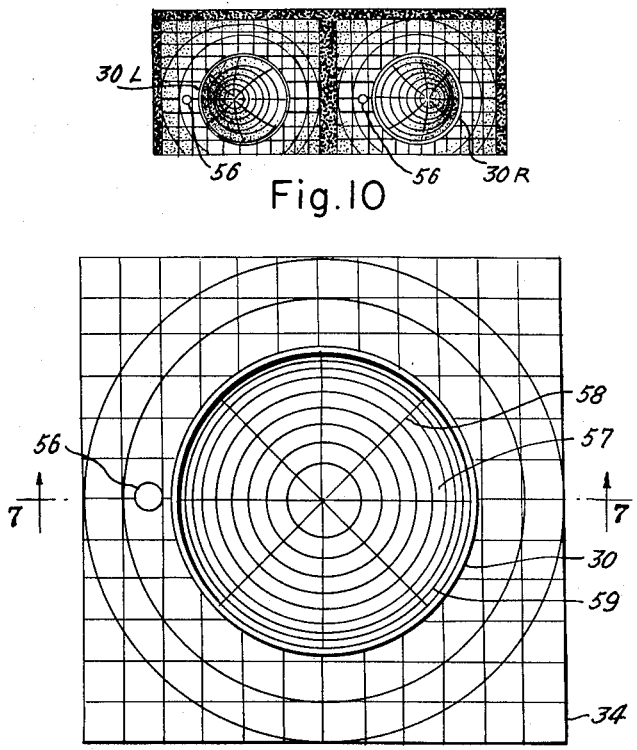
Fig. 10
Fig. 8
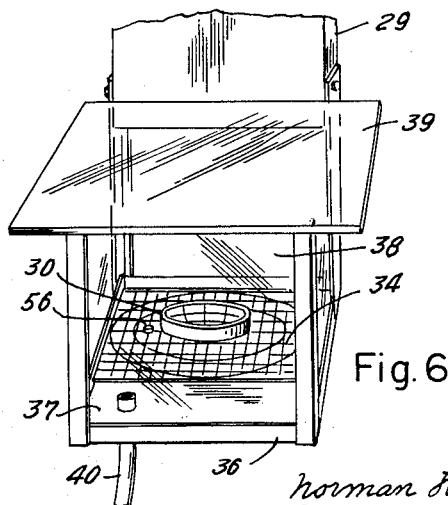
Fig. 6
INVENTORS
Norman R. Zabel
David E. Brink, deceased,
by Virginia W. Brink, Executrix,
BY John O. Evans, Jr.
ATTORNEY

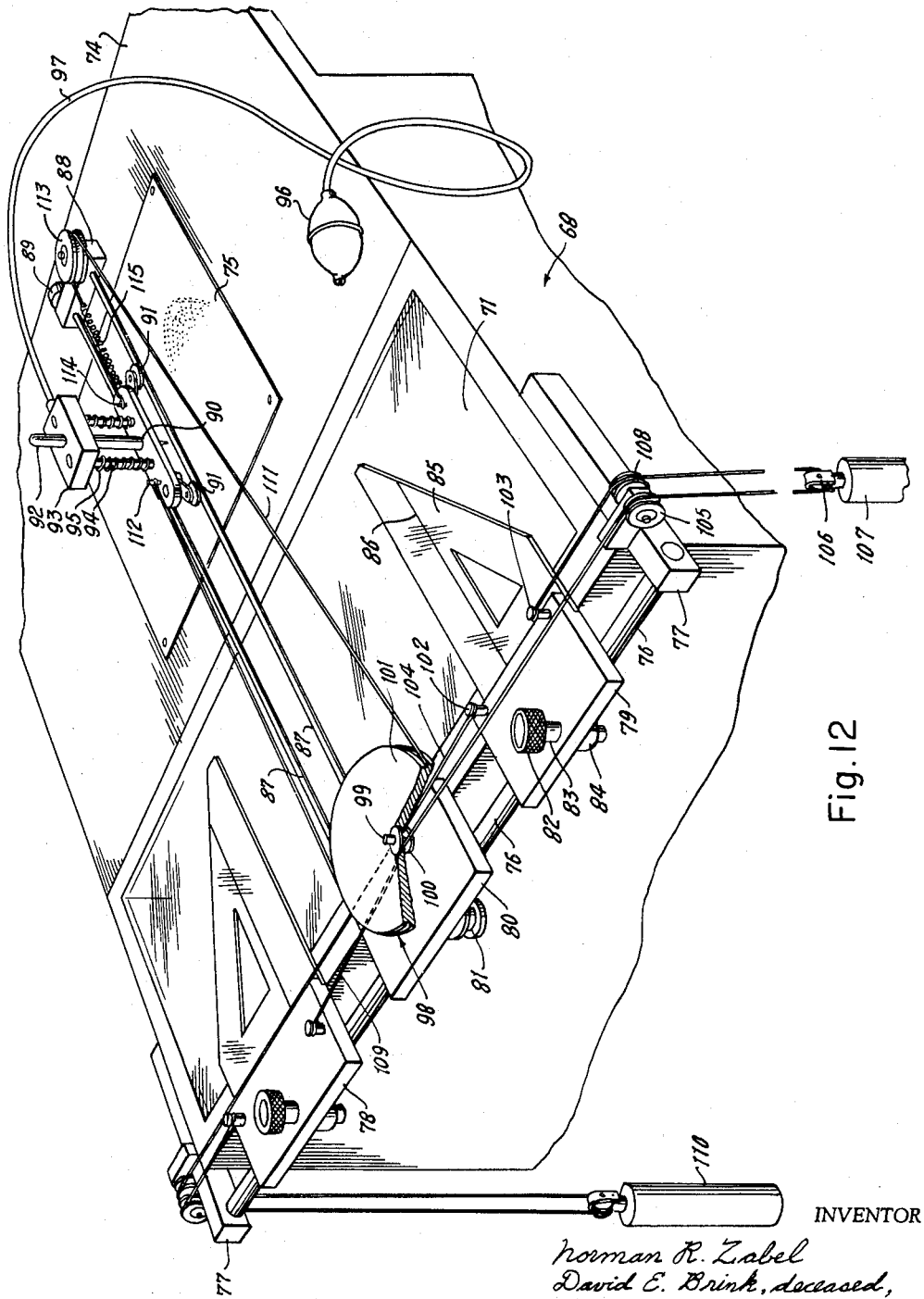

June 29, 1965    N. R. ZABEL ETAL    3,192,533
APPARATUS FOR STUDYING EXPLOSIONS STEREOSCOPICALLY
Original Filed Oct. 23, 1959    5 Sheets-Sheet 5

INVENTORS
Norman R. Zabel
David E. Brink, deceased,
by Virginia W. Brink, Executrix,
BY John O. Evans, Jr.
ATTORNEY

United States Patent Office 3,192,533
Patented June 29, 1965

3,192,533
APPARATUS FOR STUDYING EXPLOSIONS STEREOSCOPICALLY
Norman R. Zabel, Menlo Park, Calif., and David E. Brink, deceased, late of Palo Alto, Calif., by Virginia M. Brink, executrix, Palo Alto, Calif., assignors to Jet Research Center, Inc., a corporation of Texas
Original application Oct. 23, 1959, Ser. No. 848,476, now Patent No. 3,074,170. Divided and this application June 27, 1962, Ser. No. 213,075
2 Claims. (Cl. 346—107)

This invention relates to a method and an apparatus for studying explosions stereoscopically, and more particularly to the study of the collapse of the liner of a shaped explosive charge when the charge is detonated.

This application is a division of our copending application Serial No. 848,476, filed October 23, 1959, for "Method and Apparatus for Studying Explosions Stereoscopically," now U.S. Patent No. 3,074,170, issued January 22, 1963, for "Method for Studying Explosions Stereoscopically."

The advantage in having two eyes instead of one for the perception of distance is obvious, and the use of triangulation in surveying is well known. Each employs two points spaced along a base line, from which a remote point is observed. The smaller the angles between the lines of sight and a given length base line, the closer the observed point is known to be. The length of the base line and the magnitudes of the angles are sufficient information for the calculation of the distance. This is the principle of optical rangefinders, and time-lapse aerial mapping cameras designed to record elevations and contours. The same principle applies when the angles are held constant and the length of the base line is varied. With fixed angles, the shorter the base line, the closer the observed point is known to be. With either arrangement, the path of an object moving in three-dimensional space can be recorded if successive synchronized stereoscopic pictures can be made from known positions on the base line. Knowing the time intervals between pictures, the speed of the object can be computed.

This can be done with two separated cameras actuated by common drive and synchronizing systems. Such an arrangement, with sufficiently fast action, could record velocities and directions of shaped charge liner elements during the collapse process.

In accordance with the present invention, a single-lens camera makes a stereoscopic picture. One essential element is an array of mirrors such that the left and right oblique views of the subject are presented in the left and right halves of the normal camera field. In the testing of small explosive charges, a wider convergence angle with a consequent increase in accuracy of triangulation, is feasible using a remote system of mirrors. By employing only one camera, the problem of synchronization is eliminated, and by producing both views on a single film, the relative positions of the two images during analysis are automatically fixed. An additional advantage is the elimination of the $40,000 cost of a second camera.

Plotting the courses of specific elements of the liner during collapse necessitates some means of identifying the elements. For this purpose, and to increase the intensity of the reflected light, a thin cadmium electroplate is applied to the inner surface of the cavity liner. Upon this white surface a circular grid system is scribed with India ink. Radial lines at 45 degree intervals are drawn to intersect the circles. The thickness of the liner is measured at each line intersection, and these measurements are used after analyzing the stereoscopic record, to compute the explosive impulse at the points of observation.

Since the cavity liner is essentially symmetrical about its axis, a plane figure derived from the intersection of any axial plane with the surface will represent the shape. In the present system of stereoscopic photography, the specific axial plane is the one containing the two points of observation at the ends of the stereo base line. The interpretation of the photographic record is simplified by mounting the test charge so that the axis of the cavity is a perpendicular bisector of this base line. This makes the stereo angles equal and the photographic images identical in size and obliquity, and reversed in aspect.

Every point on the visible surface of the subject is represented in each of the stereo images, and the two rays that produce the corresponding points in the two images leave the subject along lines with an angular separation denoted the stereo convergence angle. It follows that lines through any pair of projected points corresponding to some point on the subject, and intersecting at the same stereo convergence angle, will plot the location of the original point. A complete plot, obtained by fairing a smooth curve through a series of plotted points from edge to edge, will be of the same size as the photographic images from which the plot was made. Any scale of magnification is therefore easily obtained by optical enlargement in the projection of the image. A frame-by-frame series of plots produces a succession of shapes characteristic of the liner during the collapse phase at intervals equivalent to the framing interval of the camera during the test.

The extraction of physical measurements from the photographic record is done graphically. A projector delivers an enlarged stereoscopic image to a ground glass screen from below, and cross hairs or index marks, positioned over corresponding points in the projected images and linked by cables to the penholder, control the position of the plotting pen.

The plotting system is based upon the fixed angle, variable base line principle. Its function is to move the pen farther away as the distance between the cross hairs increases, and vice versa. The amount by which the pen must move per unit change in spacing of the cross hairs is predetermined by the geometry of the photographic system.

An object of the invention is to provide a method and apparatus for stereoscopically studying explosive events, particularly the collapse of the liner of an exploding shaped explosive charge, to obtain quantitative data pertaining to the most critical phase in the generation of the jet.

A further object is to provide a simplified stereoscopic photographic system for recording in motion picture from the action taking place when a shaped charge perforating unit, or other explosive devices, is detonated.

Another object is to provide a simple and relatively inexpensive apparatus for plotting from the motion picture stereoscopic camera record a diagram showing the relative positions in space of the liner as the shaped charge explodes.

These and other aims, objects and advantages of the invention are realized in a method for determining the trajectory and velocity of an element of the liner of a shaped explosive charge as the element is projected by explosion of the charge which includes applying a visible mark to the inner surface of the liner to identify the element; initiating the charge to explode the same; stereoscopically photographing the inner surface of the liner at least twice at predetermined spaced time intervals as the liner collapses to provide a set of stereo-pairs of images of the element at spaced points along its trajectory; plotting from the images a diagram showing the spacial positions of the element corresponding to each of the stereo-pairs of images; tracing the trajectory of the element from the positions plotted on the diagram; and calculating the velocity of the element from the distance traveled in the predetermined time intervals.

In another of its aspects, the present invention embraces apparatus for making stereo photographs of the collapsing liner of an exploding shaped explosive charge which includes a lined shaped exposive charge adapted to be exploded to project a high-velocity jet forwardly along its axis; a pair of plane stereo object mirrors mounted in front of the charge at points laterally spaced from the axis and positioned to reflect images of the liner of the charge toward the axis; an optical system having a portion positioned substantially in the jet axis of the charge for reflecting the images received from the mirrors along substantially parallel, closely spaced paths disposed at a substantial angle to the axis; an ultra high-speed camera disposed at one side of the jet axis of the charge and positioned to photograph the image reflected along the parallel paths; and means for exploding the charge and operating the camera to photograph the event.

In yet another aspect, the present invention relates to a stereo plotting machine including means providing a working surface for receiving a stereo-pair of images from which a plot is to be made; a straight track adjacent to the working surface; a first car mounted for movement along the track; first index means carried by the first car for movement over the working surface; a second car mounted for movement along the track; second index means carried by the second car for movement over the working surface; a follower mounted for movement along the track; a plotting arm carried by the follower, the plotting arm having a portion moveable over the plotting surface; a carriage mounted for movement along the plotting arm in a direction perpendicular to the track and over the plotting surface; a marker mounted on the carriage; means for actuating the marker to apply a mark to the plotting surface; differential linkage means coupling each of the cars to the follower and to the carriage such that, for all positions of the cars on the track, the distance between the follower and the first car is equal to the distance between the follower and the second car plus a constant distance, and the distance of the carrier from the track is equal to one-half the distance between said cars multiplied by a constant factor plus a constant distance. More particularly, the distance from the follower to either of the cars is the same, and the foregoing constant factor is the cotangent of one-half the stereo convergence angle of the stereo-pair of images.

In the drawings:

FIG. 6 is a further enlarged perspective view of the charge-mounting portion of the apparatus;

FIG. 8 is a plan view of the charge and associated parts of FIG. 7;

FIG. 9 is a diagramamtic view of portions of the optical system of the apparatus;

FIG. 10 is a view of a photographic film having a stereo-pair of images produced by the apparatus;

FIG. 12 is an enlarged perspective view of the plotting apparatus shown in FIG. 11;

Figure 1:
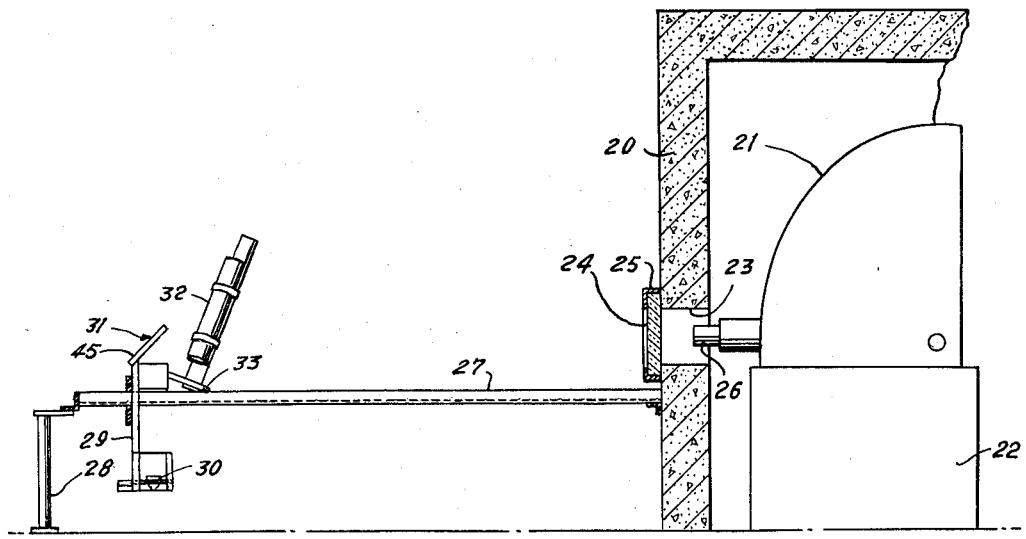
FIG. 1 is a side elevational view, partly in section, of exemplary apparatus in accordance with the invention for making ultra high-speed stereoscopic photographs of the liner of a shaped explosive charge as the liner collapses when the charge is exploded.
Figure 2:
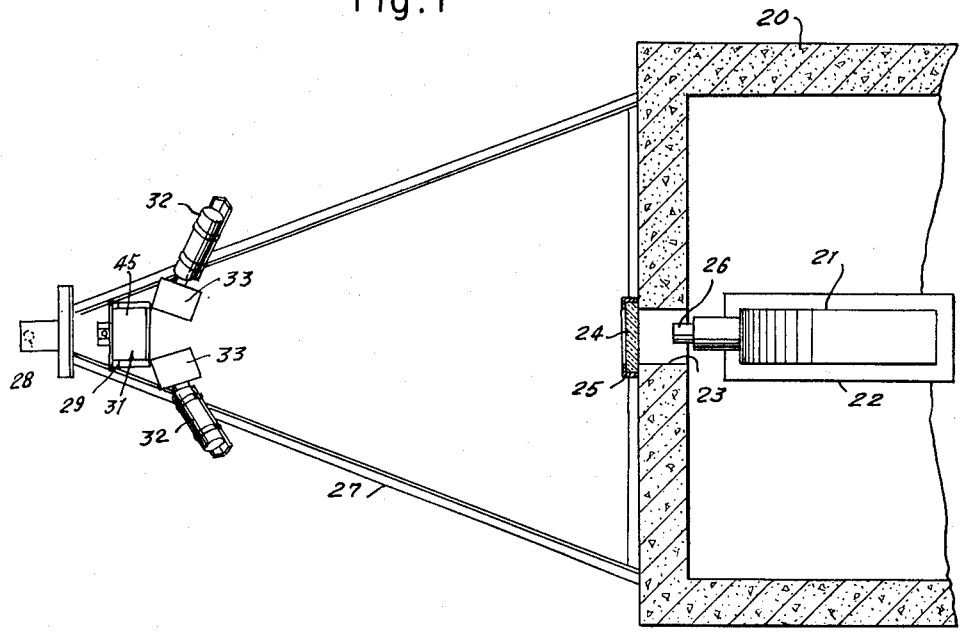
FIG. 2 is a plan view, partly in section of the apparatus of FIG. 1.

Referring to the drawings, particularly FIGS. 1 and 2 thereof, the stereoscopic photography apparatus shown includes a bombproof 20 enclosing a camera 21, specifically an ultra high-speed framing camera mounted on a base 22. The bomproof has a port 23 covered by a piece of explosion proof glass 24 mounted in a frame 25 on the front wall of the bombproof. The objective 26 of the camera is pointed out through the port 23.

A horizontal A-frame 27 has its legs supported on the front wall of the bombproof and an upright strut 28 supports the vertex of the frame above the ground.

A bracket 29 carried by the A-frame supports a shaped explosive charge unit 30 which is to be photographed and a stereoscopic mirror system 31 for directing stereoscopically related images of the shaped charge into the camera.

Intense illumination is required for making the photographs under the extremely short exposure conditions that are necessary where a number of separate exposures are made in a matter of a few milliseconds. Illumination is supplied by a pair of argon bombs 32. Fresnel lenses 33 focus the light from the argon bombs upon the shaped charge unit.

Figure 4:
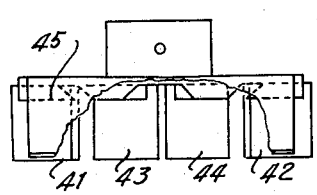
FIG. 4 is a plan view of the sub-assembly of FIG. 3.
Figure 3:
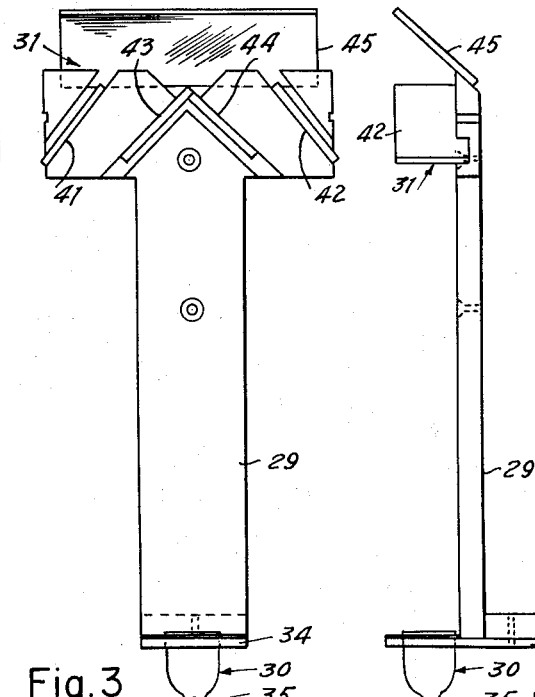
FIG. 3 is an enlarged, front elevational view of a sub-assembly of the apparatus of FIGS. 1 and 2, the sub-assembly including a shaped charge to be studied, a system of mirrors for viewing the shaped charge, and a bracket for mounting the charge and mirrors.
Figure 5:
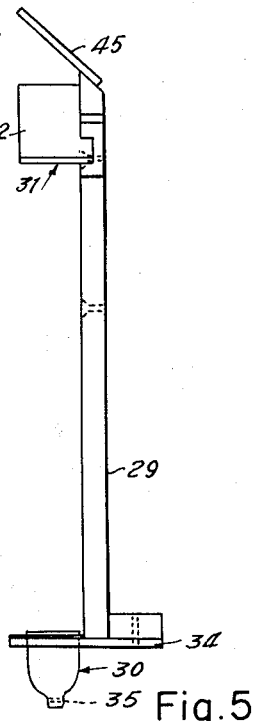
FIG. 5 is a right side elevational view of the sub-assembly.

Referring to FIGS. 3 to 5 of the drawings, the sub-assembly shown includes the bracket 29 supporting the shaped charge unit 30 and the stereoscopic mirror system 31. The shaped charge unit 30 is supported in a horizontal plate 34 affixed to the bottom of the upright portion of the bracket. The shaped charge is positioned to direct the jet, produced upon explosion of the charge, vertically upwardly, the charge being detonated by the usual Primacord fuse received in the transverse passage 35 in the bottom of the shaped charge unit, as is conventional.

As shown in FIG. 6, the shaped charge unit 30 and horizontal plate 34 are enclosed within a housing having a metal framework 36 supporting a wooden bottom panel 37 and transparent glass side panels 38 to provide a generally cubical housing. The top of the housing is closed by a sheet 39 of transparent glass.

A flexible hose 40 passing through the bottom panel 37 conducts butane from a source (not shown) thereof into the shaped charge housing to provide a butane atmosphere therein. The explosion of the shaped charge in a butane atmosphere is desired since butane does not emit light when subjected to the shock of the explosion. Other innocuous gases may be used instead of butane. Air would be unsatisfactory as the environment in which to explode the shaped charge, since air does emit visible light under the impact of the explosion; such visible light would interfere with obtaining good photographs of the exploding shaped charge unit.

Referring again to FIGS. 3 to 5, the stereoscopic mirror system includes a pair of stereo object mirrors 41 and 42 mounted on the transverse member of the bracket 29. The mirrors 41 and 42 are spaced at equal distances on opposite sides of the vertical axis of the system which coincides with the jet axis of the shaped charge unit 30. The mirrors are in front of the shaped charge unit and are inclined to reflect the separate images of the shaped charge horizontally inwardly toward the axis. The mirrors are silvered on their front surfaces that face the shaped charge unit.

A pair of plane collimating mirrors 43 and 44 are mounted on the transverse member of the bracket 29 at approximately the same level as the stereo object mirrors but nearer the vertical axis of the system. The purpose of the collimating mirrors is to receive the images reflected from the object mirrors 41 and 42 and to reflect the images vertically upward parallel to the axis of the system. The collimating mirrors are silvered on their upper surfaces and are disposed at angles to the vertical axis of the system appropriate to provide parallelism of the rays reflected therefrom. In the apparatus shown, these mirrors are disposed at 45 degrees to the vertical axis.

The transverse member of the bracket 29 carries a plane diverting mirror 45, the purpose of which is to receive the collimated images reflected from the mirrors 43 and 44 and to reflect them along parallel lines horizontally into the camera through its objective 26, as shown in FIGS. 1 and 2. For this purpose, the diverting mirror is inclined toward the camera at 45 degrees to the horizontal and the mirror preferably is silvered on its lower surface.

Figure 7:
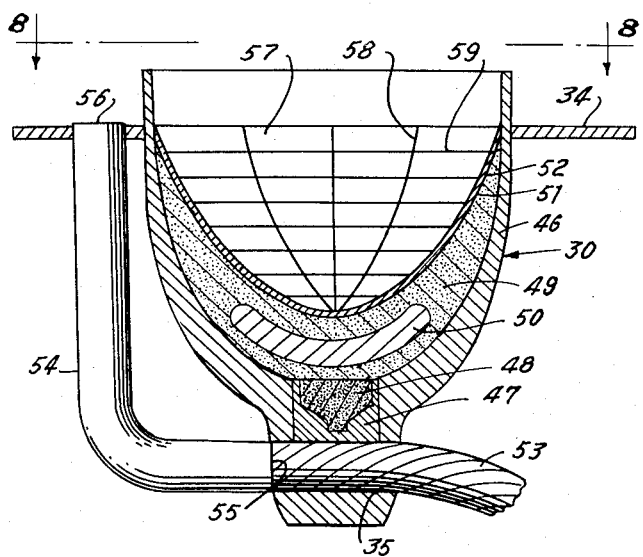
FIG. 7 is a still further enlarged vertical sectional view of the mounted charge and associated parts.

Referring to FIGS. 7 and 8, the shaped charge unit 30 may be of any desired type but is specifically shown herein as having a metal case 46 in the form of a body of rotation symmetrical about a vertical axis. A booster cup 47 is axially received in the case near the base thereof and a booster charge 48 is seated in the booster cup. The main explosive charge 49 is seated in the case forwardly of the booster charge and a barrier 50 of metal is embedded in the main explosive charge and positioned transversely and symmetrically of the axis. The front face 51 of the main charge is hollow and provides an ellipsoidal cavity symmetrical about the axis. The cavity is lined with a thin copper liner 52 of corresponding ellipsoidal shape.

The booster is detonated sympathetically by a length of Primacord fuse 53 received in the passage 35 in the case 46, the Primacord fuse being initiated by a conventional detonator (not shown).

When the Primacord fuse is initiated, the detonation wave travels therealong to the location of the booster cup 47. The booster charge is detonated. The detonation wave travels symmetrically forwardly through the booster charge and into and through the main charge 49 to attack the liner 52. The action of the detonation wave upon the liner collapses the liner to form a high velocity, forwardly moving the jet of liner material, the jet having extremely high penetrating power.

For purposes that will be explained more fully hereinafter, an L-shaped rod 54 of clear Lucite (a polymerized methyl methacrylate resin) has one end 55 abutting the end of the Primacord fuse 53. The other end 56 of the Lucite rod extends up through the horizontal plate 34 adjacent to the side of the charge case 46, the end 56 of the rod being visible in the field of view of the camera.

As best seen in FIG. 8, the front or inner face 57 of the charge cavity liner is marked to provide points of reference that show up in the stereoscopic photographs. The marks conveniently may take the form of lines 58 extending from the axis of the charge unit radially outwardly along the inner surface of the liner, the lines being spaced at 45 degree intervals. Circular lines 59 are drawn circumferentially about the inner surface of the liner to intersect the radial lines. The circular lines 59 define parallel planes that intersect the axis of the charge unit at right angles and at equally spaced points therealong.

FIG. 9 is a simplified diagram of the optical system including the stereoscopic mirror system 31 and the ultra high-speed framing camera 21.

The framing camera may be of the type generally disclosed in U.S. Patent No. 2,400,887, issued May 28, 1946, to C. D. Miller for "High-Speed Motion-Picture Camera." Other ultra high-speed framing cameras of more modern construction may also be employed. In general, such cameras have a primary optical system including an objective lens 60 and a field lens 61. A rotating flat, or prismatic, mirror 62 causes the image from the primary optics 60, 61 to be rotated in a circular path around the axis of rotation of the mirror 62. The camera also includes a number of secondary optical systems that receive the image as reflected by the rotating mirror 62 and project it onto discrete areas spaced along a photographic film 63 arranged circularly about the rotating mirror. In a typical ultra high-speed framing camera, such as indicated at 21 in FIGS. 1 and 2, there are twenty-five such secondary optical systems, each of which includes a secondary objective lens 64 and a secondary field lens 65 for focusing the images on spaced frames on the film.

Cooperating diamond stops, one 66 of which is interposed in the primary optical system between the lenses 60 and 61, and the other 67 of which is interposed one in each of the secondary optical systems between the lens 64 and 65, serve as shutters for the camera. An exposure is made on the film only when the rotating mirror 62 is in substantially the exact position to reflect the image received from the primary optical system directly along the optical axis of a secondary optical system. In the camera, there is a master capping shutter (not shown) that is actuated to make a timed series of exposures. Cameras of this sort are well known in the art. Some of them require means for synchronizing the master shutter with the event to be photographed while others do not require synchronizing means.

FIG. 10 shows one of the frames of the photographic film, after development, in which the stereo-pair of images of the shaped charge and holder clearly appear. The image of the charge unit 30 as viewed from the right hand object mirror 42 is seen at 30R and the image as viewed from the left hand object mirror 41 is seen at 30L. The end of the Lucite rod is seen at 56 in each half in FIG. 10.

In operation, the photographic apparatus is set up as shown in FIGS. 1 and 2. The camera 21 is made ready to photograph the shaped charge unit 30 when the latter is exploded. The argon flash bombs 32 are prepared for firing to illuminate the subject. When all is in readiness, the flash bombs are ignited. During the period of illumination, the shaped charge unit is detonated and the explosion is photographed by the camera 21 to produce a series of, say, twenty-five exposures of the shaped charge as it explodes, the exposures being made at equal known time intervals.

One of the frames of the photographic film shows the end 56 of the Lucite rod as being illuminated. This frame marks the time at which the detonation wave in the Primacord 33 reaches the end 55 of the Lucite rod against which it abuts. This frame may be taken as the zero reference frame and is approximately the time at which detonation of the main explosive charge of the shaped charge unit begins. The time interval between successive frames on the photographic film is known from the geometry of the of the camera and the speed of the rotation of the mirror 62. In a later frame of the photographic record, disturbances will be observed in the liner as it begins to collapse under attack of the detonation wave from the explosive charge. Later frames of the photographic record will show later stages in the collapse of the liner. The collapse of the liner can be observed through a number of successive frames of the film and valuable information thus obtained concerning the actual velocity and direction of each observed element of the liner.

Figure 11:
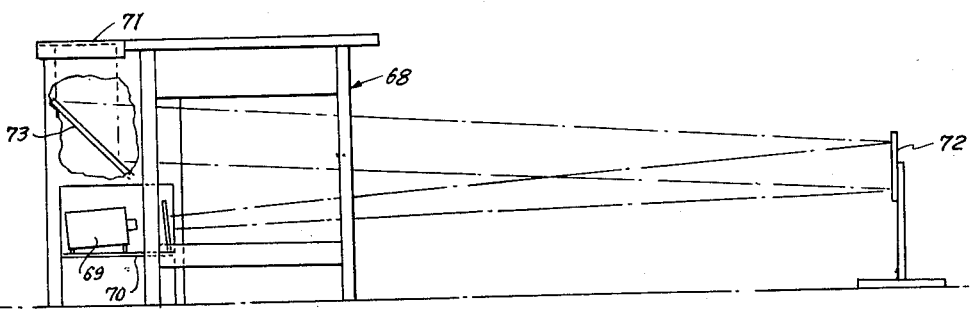
FIG. 11 is a side elevational view of a stereoscopic plotting apparatus in accordance with the invention.

The information on the photographic record of the explosion is obtained in useful form by a stereoscopic plotting machine as shown in FIGS. 11 and 12. Referring to FIG. 11, the plotting apparatus includes a table 68 having a conventional slide projector 69 mounted on a shelf 70 below the top of the table. A frame of the stereoscopic film record to be analyzed is positioned in the projector and its image is enlarged and projected onto a ground glass section 71 of the table top. The optical projection system includes a relay mirror 72 positioned at some distance to the rear of the table to reflect the image from the projector upon an inclined mirror 73 mounted below the ground glass 71. The mirror 73 is disposed at the proper angle to project the image upwardly onto the ground glass as shown in FIG. 11.

Referring to FIG. 12, the table 68 has a top surface including the ground glass screen 71 which provides a working surface at the front of the table and a plotting area 74 at the rear of the table. A piece of paper 75 is fastened to the plotting surface to receive the plot.

A horizontal bar 76 is positioned at the front of the table and supported by brackets 77. The bar provides a track along which a left index car 78, a right index car 79, and a follower car 80 are mounted for translation. Grooved wheels, such as the wheel 81, support the cars for lateral movement along the track. Each of the index cars has a knob 82 on a shaft 83 journaled in the car body. The lower end of the shaft has a friction wheel 84 of rubber or the like that engages the bar 76. When the operator rotates either of the knobs 82, the index car is moved along the bar 76.

Each of the index cars has a transparent index arm 85 mounted thereon and slidable transversely over the ground glass 71 as the car moves along the track. An index mark 86 is scribed on the index arm, the index mark being a line perpendicular to the bar 76.

The follower car 80 has a plotting arm extending perpendicularly to the bar 76 and overlying the ground glass 71 and plotting surface 74. The plotting arm includes a pair of parallel rods 87 mounted on the follower car at one end. The other ends of the rods 87 are mounted on a dolly 88 having a wheel 89 which rides on the plotting surface 74.

A pen carriage 90 is movably mounted on the plotting arm rods 87, 87 by wheels 91 for movement along the rods 87, 87. A pen 92 is mounted in a block 93, the block being vertically slidable on rods 94 and urged to the raised position illustrated in FIG. 12 by springs 95. A syringe bulb 96 is connected by a flexible tube 97 to the block 93. A piston-and-cylinder arrangement (not shown) within the block 93 is responsive to air pressure delivered from the syringe bulb to depress the block 93 and to press the point of the pen onto the paper 75 to mark the latter. When the operator desires to mark, he merely squeezes the bulb 96 to depress the pen. The springs 95 restore the block and pen to the raised position when the syringe bulb is released.

For reasons which will appear more fully hereinafter, the line perpendicular to the bar 76 that is followed by the point of the pen 92 as the pen carriage moves along the plotting arm should preferably be exactly half way between the index marks 86. Also, the perpendicular translation of the pen with respect to the bar 76 must be equal to the change in the lateral spacing of the index marks 86 multiplied by the cotangent of one-half the stereo convergence angle of the stereo-pair of photographs being plotted. The stereo convergence angle is a constant of the optical system of the stereoscopic photographic apparatus described hereinbefore. The stereo convergence angle is the angle at a point on the subject included between the rays from that point as viewed from the stereo object mirrors 41 and 42 and projected upon the photographic film to produce the stero-pair of images of that point.

The pen point must also move laterally as the index marks scan from one side of the projected images to the other. When the cross hairs move equal distances in the same direction, the pen point must perform exactly the same motion. When one index mark moves and the other remains stationary, the pen must move in the same direction but only half as far. When the index marks move equal distances in opposite directions, the pen point must move only along its perpendicular track with no lateral displacement. When the index marks move different distances in opposite directions, the pen point must move laterally by half the amount of the difference and along its perpendicular path according to the cotangent relationship previously described.

The foregoing described motions of the pen point are accomplished by a system of pulleys and cords. A capstan 98 is rotatably mounted on a vertical shaft 99 fixed to the follower car 80. The capstan has a driven wheel 100 and a driving wheel 101 mounted on a common hub and arranged to turn as a unit. The ratio of the diameter of the driving wheel to the diameter of the driven wheel is equal to the cotangent of one-half the stereo convergence angle.

The right index car 79 has an anchor post 102 on its left side and another anchor post 103 on its right side. A cord 104 has one end fixed to the anchor post 102. The cord is wrapped around the driven wheel of the capstan in a counter-clockwise direction looking down, is passed over an idler pulley 105 at the right side of the table around a pulley 106 supporting a hanging weight 107 and, thence, is returned over another pulley 108 and fixed to the anchor post 103 on the right index car.

The left index car 78 has a similar cord 109 tensioned by a hanging weight 110 and wrapped around the driven pulley of the capstan in the same direction as the cord 104 of the right index car.

Another cord 111 has one end attached to the pen carriage at 112. The cord is passed around the driving wheel 101 of the capstan in a counter-clockwise direction looking down.

The cord is carried back to an idler wheel 113 rotatably mounted on the dolly 88. The other end of the cord is attached to the pen carriage at 114. A spring 115 is interposed in the cord to tension the cord about the wheels 101 and 113.

Other means may be provided for differentially linking the cars to the follower and the pen carriage. For example, rack-and-pinion devices may be used. The driven wheel 100 may be a pinion driven by racks carried by the left and right cars and engaging the pinion on opposite sides. Also, the driving wheel 101 may be a pinion engaging a rack attached to the pen carriage 90.

The foregoing described system provides the desired pen movement.

In operation, a pair of stereo images from a frame of the stereoscopic photographic record is projected upon the ground glass 71. Since the collapse of the shaped charge liner is essentially symmetrical about the charge axis, it is convenient to plot only a section of the liner determined by the intersection of a plane through the axis of the charge unit and the base line with the inner surface of the liner. Referring to FIG. 10, this section falls along a straight line passing through the vertices of the two liner images appearing in the photograph. This straight line corresponds to the base line.

To plot a selected point along the chosen medial section of the liner, the operator moves the right index car 79 to bring the index mark 86 into coincidence with the selected point of the right hand image as projected on the ground glass screen. Similarly, the left index car 78 is placed in coincidence with the corresponding point appearing in the left hand image. The syringe bulb 96 is squeezed to cause the pen 92 to produce a mark on the paper 75 corresponding to the point being plotted.

A number of selected points along the section of the liner is similarly plotted to define the position of the liner along the section.

Figure 13:
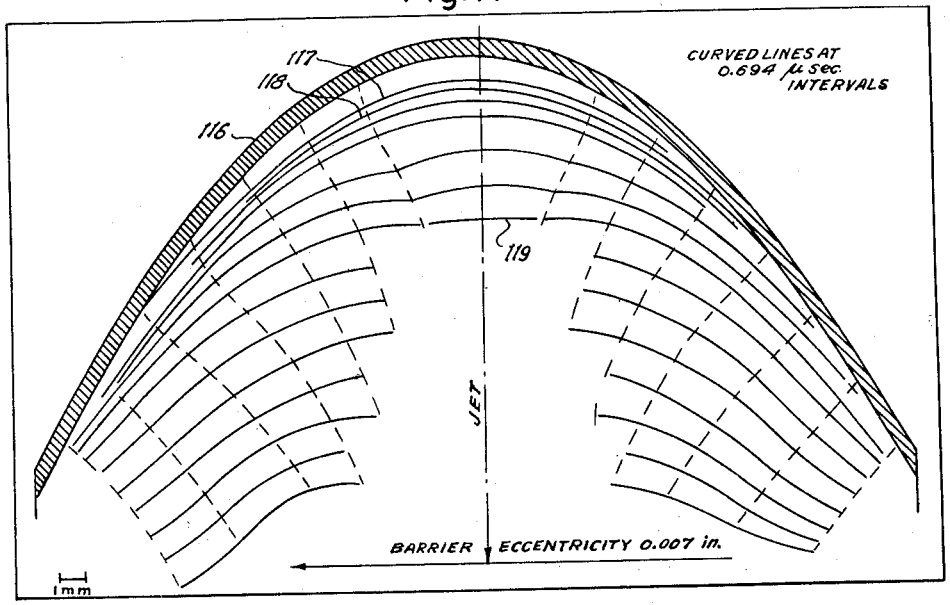
FIG. 13 is an enlarged plan view of a plot made with the plotting apparatus.

Each frame of the series of frames of the photographic record that pictures the liner during successive stages of collapse is similarly plotted to provide a diagram as shown in FIG. 13.

Referring to FIG. 13, showing a plot of a stereoscopic framing camera record consisting of fifteen successive frames, the enlarged axial cross-section of the liner is shown at 116. The inner surface of the liner is plotted from the first frame picturing the liner before it starts to collapse. The curved line 117 is plotted from the second frame and shows the position of the liner 0.694 microsecond after the liner starts to collapse. Similarly, the line designated 118 shows the position of the inner surface of the liner after the lapse of another time interval of 0.694 microsecond. Successive liner positions at successive equal intervals of time are plotted through the fifteenth frame of the record. The scale of the diagram is indicated in the lower left hand corner of FIG. 13.

The line marked 119, corresponding to the eighth frame of the record, is the last full line shown in the drawing. Thereafter, the lines are broken in the axial zone because the surface of the liner in this zone is obscured by the jet which is formed.

It will be observed from FIG. 13 that the collapse of the liner is not exactly symmetrical. The curvature of the lines on the left side is somewhat greater than on the right side. This is due to the fact that the barrier (see the element 50 in FIG. 7) of the charge was not exactly centered. Measurements made before the charge was fired showed the barrier to be 0.007″ off center to the left, as seen in FIG. 13.

Figure 14:
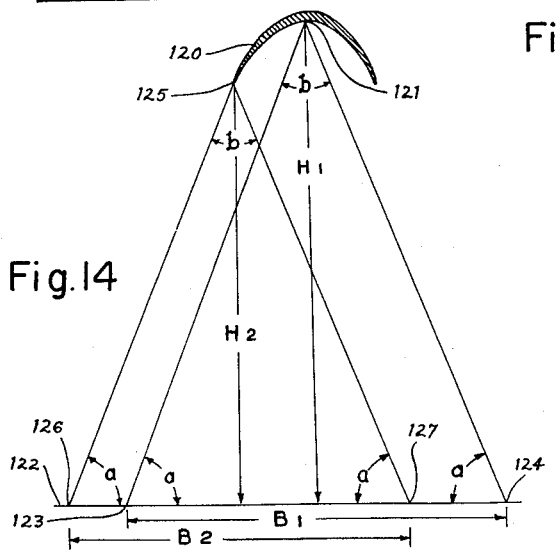
FIG. 14 is a diagram illustrating the principles of a stereoscopic system in accordance with the invention.

Referring to FIG. 14, the diagram shown therein illustrates the stereoscopic principles involved in the present invention. The liner is shown in cross-section at 120, with the vertex of the inner surface shown at 121. The line $H_1$ represents the axis of the liner. The base line is indicated at 122. This line is perpendicular to the axis of the liner. With reference to the stereoscopic plotting apparatus described hereinbefore, the base line 122 of FIG. 14 is parallel to the bar 76 shown in FIG. 12 and either coincident with or spaced a given distance therefrom. With reference to the stereoscopic photographic apparatus described hereinbefore, the base line 122 of FIG. 14 is perpendicular to the axis of the charge unit; it may be considered to pass through the centers of the stereoscopic object mirrors 41 and 42 of FIGS. 3 to 5 at the points shown at 123 and 124 in FIG. 13; or it may be considered to be parallel to a line passing through the centers of the stereo object mirrors, in which case the points 123 and 124 are projected thereupon by extending or shortening the rays from the point 121 on the liner. The angle $b$ is the stereoscopic convergence angle. The angles $a$ are equal to each other and are defined as the stereo angles. Angles $a$ and $b$ are determined by the fixed angles of the stereo object mirrors 41 and 42.

From the geometry of the diagram of FIG. 14 is seen that the ratio of the perpendicular distance of the observed point 121 from the stereo base line 122 to one-half the length of the stereo base line from point 123 to point 124 is the cotangent of one-half the stereo convergence angle $b$.

The point 125 at the left edge of the liner as represented in FIG. 14 is a distance $H_2$ from the base line 122 when observed by the stereo object mirrors 41 and 42, FIG. 3. Stereoscopically projected images of the point 125 appear on the base line at 126 and 127 respectively. The stereo angles $a$, $a$ and the stereo convergence angle $b$ for the point 125 are the same as for the point 121 at the apex of the liner. For the point 125, the ratio of the perpendicular distance $H_2$ of the observed point from the stereo base line to one-half the length of the stereo base line between the points 126 and 127 is the cotangent of one-half the stereo convergence angle $b$. This is the same ratio that obtains for the point 121 and for any other observed point.

The plotting apparatus of FIG. 12 is concerned with changes in the perpendicular distance of the marking pen from the track bar 76, rather than the absolute distance. Therefore, the initial position of the pen carriage on the plotting arm is not critical. However, the cord 111 should not be allowed to slip on the pulley wheels in the analysis of a family of stereoscopic photographs.

Changing the position of the pen carriage, as by slipping the card 111 on the pulley wheels, merely moves the base line toward or away from the track bar 76. If the base line happens to lie in the vertical plane through the track bar, the distance of the pen from the bar is equal to one-half the perpendicular distance between the index marks on the right and left cars multiplied by the cotangent of one-half the stereo convergence angle. If the base line is displaced by slipping the cord 111, the distance of displacement is algebraically added to the distance of the pen from the base line, as determined by the cotagent law, to give the distance of the pen from the track bar. Such displacement is constant and may be zero.

The plotting apparatus of FIG. 12 is concerned with changes in lateral position of the marking pen, rather than its absolute position. Thus, the initial position of the follower with respect to the index cars is not critical. But the cords 104 and 109 should not be allowed to slip on their pulley wheels in the analysis of a family of stereo-photographs.

Preferably, the track of the pen along the plotting arm is half way between the indexed marks. However, the pen track may be displaced a constant distance to the right or left, as by slipping the cords 104 and 109, which merely displaces the plot an equal distance in the same direction. As long as such displacement remains constant for the analysis of a family of stereoscopic photographs, the resulting plot will be valid. It is thus seen that the track of the pen along the plotting arm is half way between the index marks plus a constant distance which may be zero.

Certain changes may be made in the specific mirror system 31 shown in FIGS. 3 to 5 of the drawings without departing from the invention. The stereo object mirrors may be placed at other positions and at other angles than shown as long as they provide two views of the subject seen from spaced points on a base line and looking at all points on the subject with a predetermined stereo convergence angle. The collimating mirrors may also be rearranged as long as they reflect the images received from the stereo object mirrors along parallel, closely spaced paths. The diverting mirror may be placed at a different position as long as it performs the necessary function of reflecting the collimating images out of the path of the shaped charge jet so that the camera may be protected from the effects of the explosion. Prisms may be substituted for the mirrors of the external mirror system 31.

Instead of the ultra high-speed framing camera shown by way of illustration, other types of cameras may be employed to make a photographic record of the explosion. The so-called smear camera may be used to advantage. The smear camera is similar to the framing camera in that it has a rotating mirror. However, instead of having a number of secondary optical systems focusing on separate frames, the reflected image is merely scanned over the surface of the film to produce a continuous record. The stereo-pair of images made by the smear camera may be analyzed in the plotting apparatus of the present invention.

We claim:

1. Apparatus for making stereo-photographs of the collapsing liner of an exploding shaped charge which comprises: means for mounting a lined shaped explosive charge adapted to be exploded to project a high-velocity jet forwardly along an axis; a pair of plane stereo-object mirrors mounted in front of said charge mounting means at points laterally spaced from said axis and positioned to reflect towards said axis images of the liner of a shaped charge mounted in said mounting means; an optical system having a portion thereof intersected by said axis, said optical system reflecting the images received from said mirrors along substantially parallel, closely spaced paths disposed at a substantial angle to said axis; a camera disposed entirely at one side of said axis and positioned to photograph the images reflected along said parallel paths; means for exploding a shaped charge mounted in said mounting means; and means for operating said camera to photograph the explosion.

2. Apparatus for making stereo photographs of the collapsing liner of an exploding shaped explosive charge which comprises: means for mounting a lined shaped explosive charge adapted to be exploded to project a high-velocity jet forwardly along an axis; a pair of plane stereo object mirrors mounted in front of said charge mounting means, the reflecting surfaces of said mirrors facing said charge mounting means and being intersected by a stereo base line that intersects said axis at right angles and that intersects said reflecting surfaces at points equidistant from said axis, the reflecting surfaces of said mirrors being perpendicular to the plane defined by said axis and said base line, the reflecting surfaces of said mirrors including a dihedral angle the vertex of which is intersected by said axis at a point farther from said charge than the point of intersection of said axis by said said base line; a pair of plane collimating mirrors mounted between said stereo object mirrors, the reflecting surfaces of said collimating mirrors facing the reflecting surfaces of said stereo object mirrors and being intersected by said stereo base line at points equidistant from said axis, the reflecting surfaces of said collimating mirrors being perpendicular to the plane defined by said axis and said base line, the reflecting surfaces of said collimating mirrors including a right dihedral angle the vertex of which is intersected by said axis at a point between the point of intersection of said axis by said base line and the point at which said axis is intersected by the vertex of the dihedral angle included between said object mirrors; a plane diverting mirror mounted in front of said collimating mirrors, the reflecting surface of said diverting mirror facing the reflecting surfaces of said collimating mirrors and being intersected by said axis, the reflecting surface of said diverting mirror being perpendicular to the plane bisecting the right dihedral angle included between the reflecting surfaces of said collimating mirrors and disposed at an angle of 45 degrees to the line of intersection of the reflecting surfaces of said collimating mirrors; a camera disposed entirely at one side of the jet axis of said shaped explosive charge and positioned to photograph the stereo-images reflected from said diverting mirror; and means for exploding said charge and operating said camera to photograph the explosion.

References Cited by the Examiner

UNITED STATES PATENTS

| | | | |
|---|---|---|---|
| 2,627,201 | 2/53 | Baker | 88—1 |
| 2,961,918 | 11/60 | Nadig et al. | 352—84 |
| 2,992,591 | 7/61 | Courtney-Pratt | 352—84 |

JULIA E. COINER, *Primary Examiner.*

NORTON ANSHER, *Examiner.*